United States Patent Office 2,710,862
Patented June 14, 1955

2,710,862

PRODUCTION OF DIARYLDIAZOMETHANES

William Schroeder, West Lafayette, Ind., assignor to Schenley Industries, Inc., New York, N. Y., a corporation of Delaware No Drawing. Application December 8, 1953,
Serial No. 397,045

7 Claims. (Cl. 260—239)

The present invention relates to the production of diaryldiazomethanes, which are useful intermediates for the production of benzhydryl ether derivatives having antihistaminic and antispasmodic activities and other compounds.

It is a principal object of the present invention to provide an improved process for the production of diaryldiazomethanes from benzophenone hydrazones. A further object of the present invention is to provide such a process which is capable of producing the desired diaryldiazomethanes in greater yields and in a shorter period of time and that is more readily controlled than processes heretofore available. Other objects and advantages of the invention, some of which are referred to hereinafter more specifically, will be apparent to those skilled in the art to which the invention pertains.

Diphenyldiazomethane has heretofore been prepared by the oxidation of benzophenone hydrazone with yellow mercuric oxide by shaking a mixture of the two compounds in petroleum ether, for approximately six hours at prevailing room temperatures. This reaction is represented by the following equation:

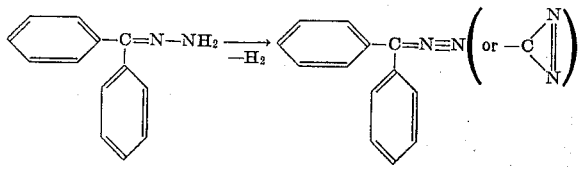

When applied to 4-chlorobenzophenone, such a process failed to produce the expected product in a satisfactory yield.

I discovered that 4-chlorodiphenyldiazomethane, as well as diphenyldiazomethane, can be produced in quantitative yields by effecting the oxidation of the hydrazone with a stoichiometrically equivalent proportion of silver oxide. Instead of requiring six hours, as does benzophenone hydrazone with yellow mercuric oxide, the reaction period is reduced to one-half hour or less, and the reaction proceeds smoothly. Whereas I was unable to obtain satisfactory yields in the oxidation of 4-chlorobenzophenone hydrazone by shaking the hydrazone with mercuric oxide in petroleum ether, even after thirty-six hours, I obtained quantitative yields with silver oxide in 30 minutes or less.

Neither copper oxide nor lead peroxide oxidized p-chlorobenzophenone hydrazone, while with manganese dioxide, a molecular excess of five moles was required to produce a quantitative yield. Silver oxide appears to be a unique and specifically peculiar oxidizing agent for this reaction. In other reactions in which silver oxide has been used, for example, in the oxidation of 1-naphthyl-hydroxylamine to nitrosonaphthalene, many times the theoretical quantity was used and the yields of the resulting nitrosonaphthalene was not quantitative.

In accordance with the process of my invention, the benzophenone hydrazone is dissolved or suspended in an inert organic solvent. At least one molecular proportion of silver oxide ($Ag_2O$) is added and the mixture is shaken for approximately one-half hour.

A drying agent such as anhydrous magnesium sulfate, sodium sulfate, copper sulfate, or similar dehydrating inorganic salts which are inert in the reaction, is preferably added at the start or during the shaking to prevent the formation of undesirable sludges of water, silver metal and unreacted silver oxide. After the oxidation is complete, the diaryldiazomethane may be recovered as a thick syrup by vacuum evaporation or the resulting solution of the diaryldiazomethane may be used as such, as illustrated in the examples hereinafter.

Inert organic solvents which can be used include ether, petroleum ether, benzene, cyclohexane, and similar ethers and aliphatic, aromatic and cycloaliphatic hydrocarbons.

Benzophenone hydrazones which can be oxidized to their corresponding diaryldiazomethanes in accordance with the process of this invention include benzophenone hydrazone, 2-chlorobenzophenone hydrazone, 2-bromobenzophenone hydrazone, 4-chlorobenzophenone hydrazone, 4-bromobenzophenone hydrazone, 4-iodobenzophenone hydrazone, 4,4'-dichlorobenzophenone hydrazone and, in general, all other benzophenone hydrazones having one or more halogen substituents in the phenyl radicals.

Preferred methods of practicing the process of my invention are illustrated in the examples which follow:

Example 1

Six grams (0.026 mole) of p-chlorobenzophenone hydrazone (prepared by heating a mixture of 4-chlorobenzophenone and anhydrous hydrazine in isopropanol for five hours at 150–160° C. in a stainless-steel bomb) was dissolved in 100 milliliters of ether. Approximately 6.3 grams (0.027 mole) of powdered silver oxide and 2.0 grams of anhydrous magnesium sulfate were added and the mixture was shaken for thirty minutes and cooled occasionally by immersion in a water bath to maintain the temperature between 30 and 32° C.

The solids, which consist of magnesium sulfate, silver and traces of unreduced silver oxide, are thereafter separated by filtration and the deep-purple-colored ethereal solution containing 4-chlorodiphenyldiazomethane may be stored as such or evaporated under vacuum at a temperature below approximately 40° C. to a thick syrup, or the solution may be used directly in synthesizing other compounds; for example, the solution can be added to a slurry of 15.0 grams (0.098 mole) of 4-nitrobenzoic acid in 100 milliliters of ether and the slurry warmed on a steam bath with occasional shaking until the purple color is discharged. The ether may be evaporated and the residue triturated with dilute aqueous sodium hydroxide solution to remove the unreacted 4-nitrobenzoic acid. The resulting ester having the formula:

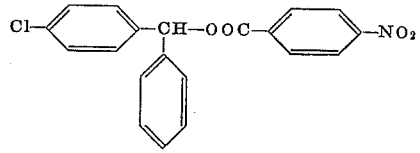

is washed with water and dried. It was obtained in a yield of 9.5 grams (99.5% of the theoretical) and its melting point was 108–110° C. On recrystallization from aqueous isopropanol its melting point was raised to 114°–115° C., which did not change on further recrystallization from petroleum ether. The 4-nitrobenzoic acid ester of benzhydrol was thus obtained in the form of white elongated plates.

The ethereal solution of 4-chlordiphenyldiazomethane, prepared in accordance with this invention, when treated with a solution of 300 milligrams of stannic chloride pentahydrate (SnCl₄·5H₂O) dissolved in a few milliliters of ether, evolved nitrogen at a rapid rate and in an amount that corresponded to the theoretical. This reduction with stannic chloride may be used as a gasometric method for the analytical assay of the diaryldiazomethane products of this invention and may be used to follow the course of the oxidation. The amount of stannic chloride which is required varies inversely with the amount of the diaryldiazomethane which is formed. If the yield of diaryldiazomethane is low, the stannic chloride forms complexes with the unchanged hydrazone and a slight excess of the quantity required for complex formation must be added before decomposition of the diazo compound sets in.

The solution of diaryldiazomethanes may also be assayed gravimetrically as an acid ester, for example, as the 4-nitrobenzoic acid ester described above. However, the benzoic acid ester of 4-chlorodiphenyldiazomethane was obtained as an oil which could not be crystallized, although the benzoic acid ester of diphenyldiazomethane crystallized from aqueous methanol and had a melting point of 84–86° C.

*Example 2*

Seventy-five grams (0.324 mole) of p-chlorobenzophenone hydrazone, 15 grams of anhydrous magnesium sulfate and 350 milliliters of benzene were charged into a 1-liter three-necked flask fitted with a stirrer, thermometer and addition funnel. Stirring was started and a 5.0-gram portion of silver oxide was added. After a short period, the purple color of the diazomethane developed and the temperature rose to 30° C. The flask was then immersed in a water bath containing cooling water at 20° C. and additional portions of silver oxide were added at such periods that the reaction temperature remained between 29 and 31° C., until 78 grams (0.336 mole) of silver oxide had been added. Approximately 25 minutes was required for this addition. The mixture was then stirred at prevailing room temperature for an additional 3 hours to insure complete oxidation. After separation of the solids by filtration, the deep-purple-colored solution in benzene of p-chlorodiphenyldiazomethane, was used directly for further condensation with tropine to produce an antihistaminic compound.

*Example 3*

In the same manner as described in Example 1, benzophenone hydrazone (4.9 grams, 0.025 mole) in solution in ether was oxidized with silver oxide, but anhydrous magnesium sulfate was not added until after the first 15 minutes. The solids were then separated by filtration and the resulting ethereal solution of diphenyldiazomethane was reacted with 15 grams of benzoic acid by heating on a steam bath for approximately 15 minutes until the purple color had disappeared. The mixture was treated with solid sodium bicarbonate to remove excess benzoic acid and the ether was evaporated. The residue was then crystallized from aqueous methanol, yielding 6 grams (83.3% of the theoretical yield) of benzhydryl benzoate having a melting point of 84–86° C.

It is to be understood that the foregoing examples represent preferred embodiments of the invention and that alterations and modifications may be made in these in conventional manners in accordance with the teachings herein without departing from the invention, whose scope is limited only by the appended claims.

I claim:

1. A process for the production of a diaryldiazomethane which comprises subjecting a solution of a benzophenone hydrazone in an inert organic solvent to the action of silver oxide and subsequently recovering the diaryldiazomethane from the resulting solution.

2. A process as defined in claim 1 in which the benzophenone hydrazone is selected from the group consisting of benzophenone and halogen-substituted benzophenone hydrazones.

3. A process as defined in claim 1 in which the inert organic solvent is selected from the group consisting of ethers, and aliphatic, aromatic and cycloaliphatic hydrocarbons.

4. A process for the production of 4-chlorodiphenyldiazomethane which comprises subjecting a solution of 4-chlorobenzophenone hydrazone in ether to the action of approximately one molecular proportion of silver oxide and subsequently recovering the resulting 4-chlorodiphenyldiazomethane.

5. A process for the production of diphenyldiazomethane which comprises subjecting a solution of benzophenone hydrazone in ether to the action of approximately one molecular proportion of silver oxide and subsequently recovering the resulting diphenyldiazomethane.

6. A process for the production of 4-chlorodiphenyldiazomethane which comprises subjecting a solution of 4-chlorobenzophenone hydrazone in benzene to the action of approximately one molecular proportion of silver oxide and subsequently recovering the resulting 4-chlorodiphenyldiazomethane.

7. A process for the production of a diaryldiazomethane which comprises subjecting a solution of a benzophenone hydrazone in an inert organic solvent and in the presence of an inert dehydrating inorganic salt to the action of silver oxide and subsequently recovering the diaryldiazomethane from the resulting solution.

References Cited in the file of this patent

Curtius et al.: Beilstein (Handbuch, 4th ed.), vol. 7, p. 418 (1925).

Staudinger et al.: Ber. Deut. Chem., vol. 49, p. 1932 (1916).

Busch et al.: Ber. Deut. Chem., vol 60, p. 2254 (1927).

Smith et al.: "Organic Synthesis," vol. 24, pp. 53–5 (1944).